United States Patent [19]

Lenack et al.

[11] 4,179,006

[45] Dec. 18, 1979

[54] TORSIONALLY RESILIENT COUPLING FOR TRANSMITTING ROTARY MOTION

[76] Inventors: Isidore J. Lenack, 6120 Jamieson Ave., Reseda, Calif. 91335; Roger D. Lenack, 20357 Tuba St., Chatsworth, Calif. 91311

[21] Appl. No.: 881,777

[22] Filed: Feb. 27, 1978

[51] Int. Cl.² .............................................. B62D 55/00
[52] U.S. Cl. ..................................................... 180/10
[58] Field of Search ......................... 180/10, 9, 9.2 R; 280/5.22, 5.26, 5.32

[56] References Cited

U.S. PATENT DOCUMENTS

| | | | |
|---|---|---|---|
| 1,502,632 | 7/1924 | Hasley | 180/10 |
| 1,604,820 | 10/1926 | Gragert | 180/10 |
| 1,679,098 | 7/1928 | Shalpar | 180/10 |
| 1,819,924 | 8/1931 | Seppola | 180/10 |
| 1,827,397 | 10/1931 | Massey | 180/10 |

*Primary Examiner*—Richard A. Bertsch
*Attorney, Agent, or Firm*—Gene W. Arant

[57] ABSTRACT

A power transmission mechanism for transmitting rotary motion performs two separate functions: It steps down the rate of rotation of an input shaft so that a rotatable member driven through the transmission mechanism rotates at a slower rate; and it also provides resilient energy storage so that the rate of rotation of the rotatable member can vary intermittently in response to load variations that are imposed upon it.

A rotatable member that is to be driven has a cylindrical track secured to it. A roller frame carries three separate rollers which engage the track at spaced locations around its circumference so that the rotatable member is rotatable relative to the roller frame. A driven shaft is directly attached to one of the rollers so as to thereby drive the rotatable member. The driven shaft is rotatably supported from an associated housing. Spring means coupled between the roller frame and the housing allow intermittent oscillation of the roller frame relative to the housing, with the result that when the rotatable output member encounters variations in the load imposed upon it, its rotation may be temporarily retarded or advanced.

8 Claims, 6 Drawing Figures

TORSIONALLY RESILIENT COUPLING FOR TRANSMITTING ROTARY MOTION

PRIOR ART

Relevant prior art known to applicants includes the following U.S. Pat. Nos.: Seppola No. 1,819,924, 1931; Massey No. 1,827,397, 1931; Panick No. 2,824,747, 1958.

BACKGROUND OF THE INVENTION

Any type of powered mechanical apparatus will, in general, be subjected to load conditions or requirements that will vary from time to time. When the load increases the machine must either increase its available supply of power or else must slow its operation, and when the load decreases the opposite response occurs.

There is often a great deal of difference in the conditions for starting the operation of a powered machine, and for merely continuing to run it once it has been started. Many types of gear shifts and variable speed transmissions have been provided for starting up a load at a lower speed than its ultimate running condition.

The present invention is concerned, however, with changes in running conditions rather than with start-up. As one example, a powered vehicle strikes an obstruction upon a roadway surface which temporarily requires a great increase in the driving power applied to one or more wheels in order to overcome the obstruction. And in industrial plants where rotary power is being transmitted, a very sudden load change may cause damage to the power transmission apparatus unless adequate means are provided for accommodating to the change.

The object of the present invention, therefore, is to provide a new and improved mechanism for transmitting rotary power, and which has a unique capability for responding to sudden changes in the mechanical load placed upon it.

A more specific object of the present invention is to provide power transmission apparatus as aforesaid, which is particularly well adapted for use in a wheeled vehicle.

SUMMARY OF THE INVENTION

According to the present invention a mechanism that reduces the rate of rotary drive is combined with bidirectional springs which provide a resilient response to any sudden change in the output load.

More specifically, a driven or input shaft is rotatably supported from a housing, and in turn drives a single roller that is small in diameter compared to a rotatable output member. The rotatable output member has a cylindrical track on which the driven roller rides. Two other rollers also ride on the track, and a roller frame maintains the circumferentially spaced positions of the three rollers. Bi-directional spring means couple the roller frame to the housing of the input shaft, so that in response to a sudden change in load on the rotatable output member the roller frame may temporarily rotate or oscillate relative to the housing.

DRAWING SUMMARY

DETAILED DESCRIPTION

Figure 1:
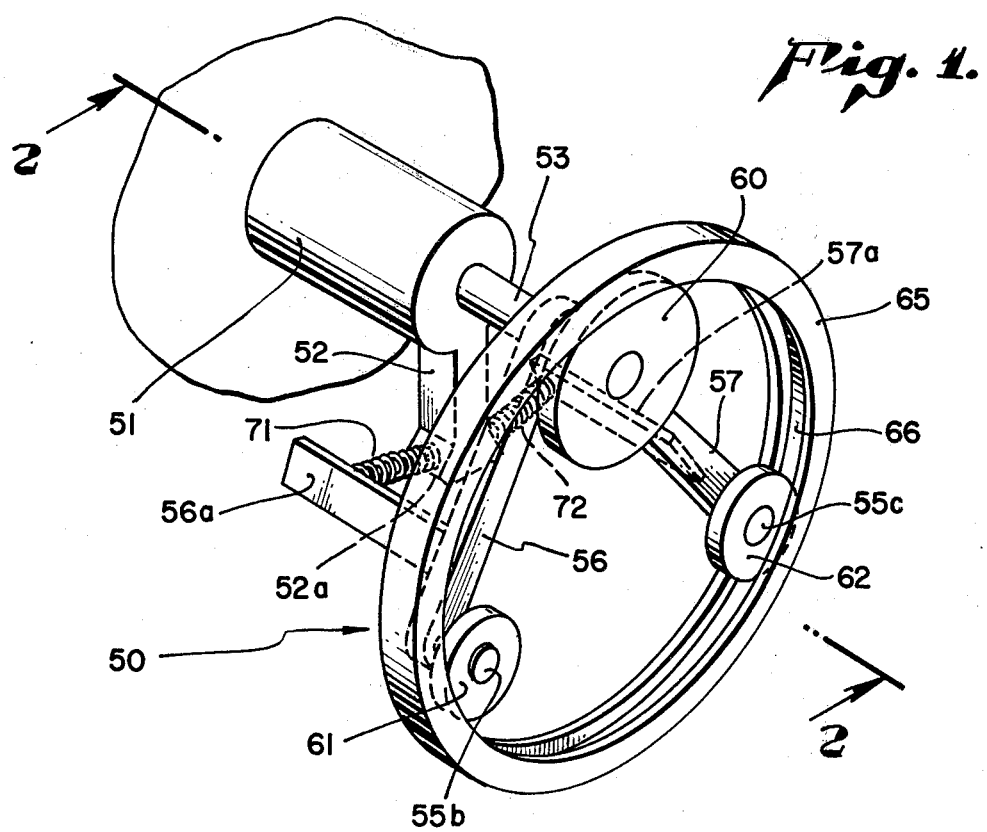
FIG. 1 is a perspective view of one embodiment of the invention incorporated into a power train.
Figure 2:
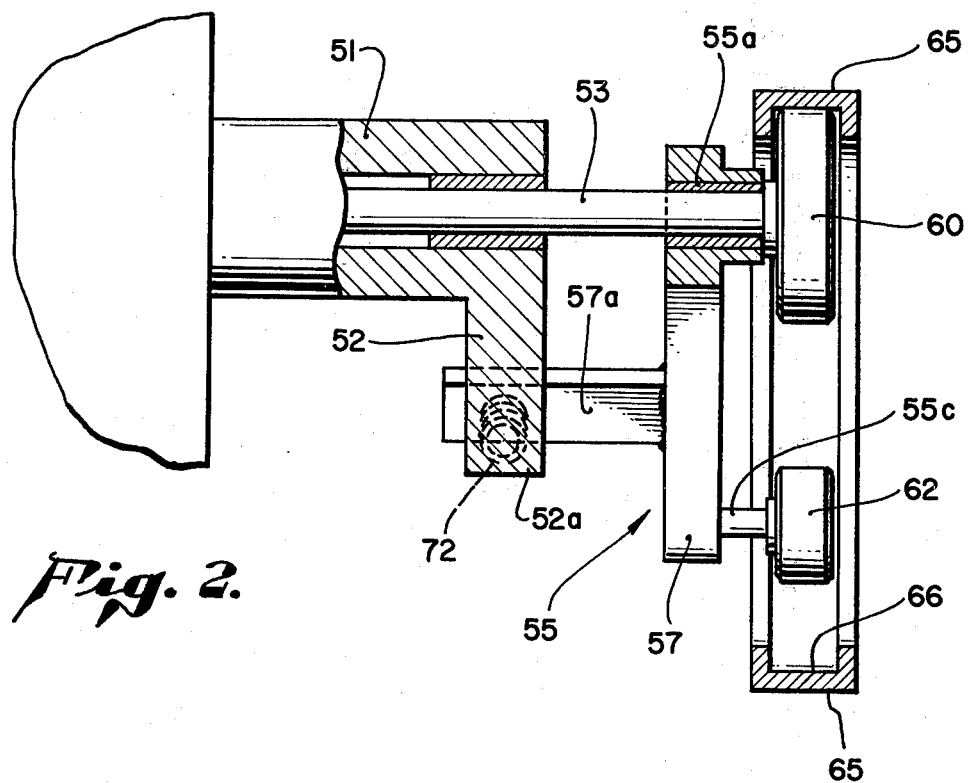
FIG. 2 is a vertical elevation view, partially in section, of the resilient coupling mechanism of FIG. 1.

(FIGS. 1 and 2)

Reference is now made to drawing FIGS. 1 and 2 for a detailed description of the first embodiment of the invention.

The power transmission apparatus 50 includes a stationary housing 51 within which an input shaft 53 is rotatably supported. The shaft 53 is rotatably driven by power means, not shown, which may be of any conventional type. A spring support arm 52 is carried by the housing 51 and held in a fixed position relative to the housing, its orientation as shown in the drawings being such that it extends downwardly below the rotatable input shaft 52.

A rotatable member 65 constitutes the output portion of the transmission mechanism 50. The rotatable member 65 is of generally ring-shaped or cylindrical configuration. When viewed in radial cross-section as seen in FIG. 2, it is of U-shaped configuration with the arms of the U being turned inwardly so as to provide a confined cylindrical track 66 on its interior surface. The input shaft 53 extends some distance beyond the extremity of housing 51 with its associated support arm 52. A roller 60 is rigidly attached to the outermost end of the input shaft 53. Roller 60 is of such thickness that it fits within the side flanges of the track 66. In the orientation of the apparatus as illustrated, rotatable member 65 rests upon the uppermost surface of roller 60, so that shaft 53 carries the weight of both roller 60 and the rotatable member 65. As shaft 53 rotates so also does the roller 60, and also the rotatable member 65, but since rotatable member 65 is of much greater diameter than roller 60 it rotates at a much slower rate. For example, if the diameter of track 66 is three times the diameter of the roller 60, and assuming no slippage of the roller on the track, then rotatable member 65 rotates at one-third the rate of the input shaft 53.

Two other rollers 61, 62 also ride within the track 66. While in the particular illustration these rollers are shown as being smaller than roller 60 they could nevertheless be of the same size, or even larger. A roller frame 55 supports the three rollers 60, 61, 62 in their relative positions as shown, so that they remain about equally spaced around the circumference of the cylindrical track surface 66. Hence, while roller 60 acts as a driven roller for producing rotation of the rotatable member 65, each of the other rollers 61, 62 is rotatably supported upon the frame 55 and therefore acts as an idler roller whose function is simply to maintain the positional relation of rotatable member 65 relative to the remainder of the apparatus.

In the particular example of FIGS. 1 and 2, frame 55 is of essentially V-shaped configuration having separate arms 56, 57. The apex of the two arms contains a bearing 55a within which the input shaft rotates. The lower extremity of arm 56 carries a pivot pin 55b upon which the idler rollers 61 rotates. In similar fashion the arm 57 at its lower extremity carries a pivot pin 55c on which idler roller 62 rotates.

All of the rollers 60, 61, 62 are in a plane which is common to the rotatable member 65. Roller frame 55 lies in a plane which is offset and parallel to the plane of the rollers. A pair of spring control brackets 56a, 57a are attached to the frame arms 56, 57, respectively, near the lower ends thereof, and extend outward perpendicularly from the roller frame 55 and hence parallel to the input shaft 53. These control brackets are of sufficient length that they extend past the spring support arm 52 on opposite sides thereof. A pair of compression springs 71, 72 are confined within the intervening spaces. That is, compression spring 71 has one of its ends confined by the spring control bracket 56a while its other end is confined on the lower extremity of spring support arm 52. Compression spring 72 has one of its ends confined by its spring control bracket 57a while its other end is confined upon the lower extremity of spring support arm 52. The two compression springs 71, 72 do not lie in a straight line but rather are arranged so that each is generally parallel to the arcuate path travelled by the respective spring control bracket. To aid in that arrangement the lower extremity of housing extension 52 is formed at 52a in a somewhat wedge-shaped configuration.

OPERATION

In the apparatus as shown in FIGS. 1 and 2 the full weight of rotatable member 65 is normally carried upon roller 60 and the springs 71, 72 are normally equally compressed, although it may be advantageous in some applications for the springs to differ from each other in either length or compressibility. Input shaft 53 is rotatably driven by conventional means, not shown, resulting in the driven rotation of rotatable member 65. Rotatable member 65, in turn, is directly coupled to any desired type of mechanical load, not shown.

When a sudden change in the load on rotatable member 65 occurs, the transmission apparatus 50 responds in an appropriate manner. If the load has increased then the rate of rotation of rotatable member 65 temporarily drops. The decrease in rotating speed is accompanied by an increased compression within one of the springs 71, 72, and which particular one becomes compressed depends upon the direction of rotation. Conversely, if there is a drop in load, the rate of rotation of member 65 momentarily increases. Again, one of the springs becomes compressed more than the other.

It will therefore be seen that the roller frame 55, idler rollers 61 and 62, spring control brackets 56a and 57a, and springs 71 and 72, constitute a mechanical system that may be capable of oscillating about a condition of rest. The degree of damping action which is designed into this system can be varied as desired, depending upon the specific requirements that are at hand. The damping action may be varied by changing the spring constant of the springs, or their weight, or the weight of the roller frame, or the friction losses encountered by the idler rollers, or any combination of these factors.

Therefore, it cannot be flatly stated either that the roller frame 55 will oscillate, or that it will not not oscillate, except that in all probability there will be at least some small degree of oscillation. The magnitude of such oscillation depends upon the design factors that have been selected. It is certainly clear that the spring 71, 72 will permit the roller frame 55 to rotate by a significant part of a revolution relative to the stationary housing 51. Whether such rotation is accompanied by oscillation will depend upon the specific design factors as mentioned above, and also will depend upon the continuing behavior of the load.

The great advantage provided by the present invention as shown in FIGS. 1 and 2 is that severe mechanical shocks that might otherwise damage the power transmission mechanism or result in an unacceptable operation of the driven load will now become cushioned by the action of the bi-directional springs 71, 72. As will be understood, this mechanism can be utilized in widely divergent applications of rotary power transmission.

While the apparatus of FIGS. 1 and 2 is shown in a particular orientation, it may be inverted so that housing arm 52 extends upwardly. Or it may be arranged at an angle in which case there is a gravitational bias on one of the springs.

One application in which the first embodiment of the invention may be advantageously employed is in the power drive for a clothes washing machine. Another is in the power drive for a cement mixer.

SECOND EMBODIMENT

(FIGS. 3–6)

Reference is now made to FIGS. 3–6 of the drawings illustrating a second embodiment 10 of the invention which is utilized in driving the wheel of a wheeled vehicle.

Figure 5:
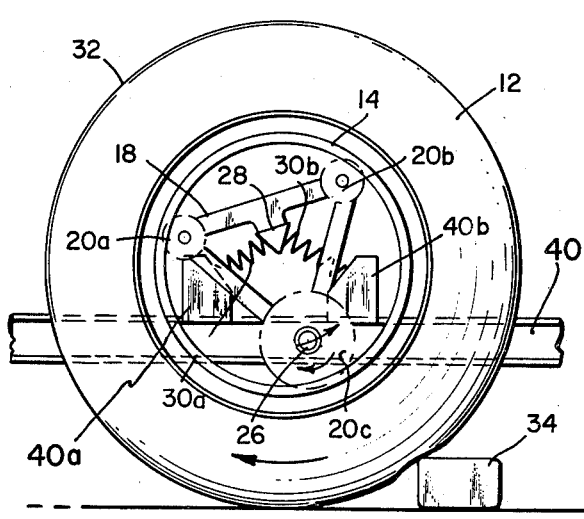
FIG. 5 is a side elevation view of the wheel and coupling mechanism of FIG. 3, shown as the wheel is about to encounter an obstacle on the roadway.

An input or driven shaft 26 is rotatably supported in housing 40 which forms a part of the vehicle frame assembly, not shown. A wheel assembly includes a metal rim 16 upon which a tire 12 is mounted. Exterior surface 32 of the tire normally engages a roadway surface 36 (FIG. 5). The housing 40 is an elongated member which is disposed interiorly of the vehicle relative to the wheel assembly, and extends horizontally from front to rear of the vehicle and at an elevation which is somewhat below the radial center of the wheel assembly.

A cylindrical track 14 mounted within the rim 16 is equipped with a large number of transversely extending, circumferentially spaced pins. A main sprocket wheel 20c is fixedly secured to the outer end of input shaft 26 and rotates with the shaft. Sprocket wheel 20c engages the cylindrical track 14, resting upon the pins thereof, and hence supporting the shaft 26 and its housing 40 upon the roadway surface 36 through the medium of the wheel assembly.

A roller frame 18 is in the form of essentially an equilateral triangle. At the lower apex of frame 18 a bushing 26a (FIG. 4) is secured, within which the shaft 26 rotates relative to the roller frame. The upper corners of the roller frame are provided with pivot pins 18a, 18b, respectively, and upon these pivot pins a pair of idler sprockets 20a, 20b, respectively, are mounted. The idler sprocket also engage the pins of the cylindrical track 14.

Figure 4:
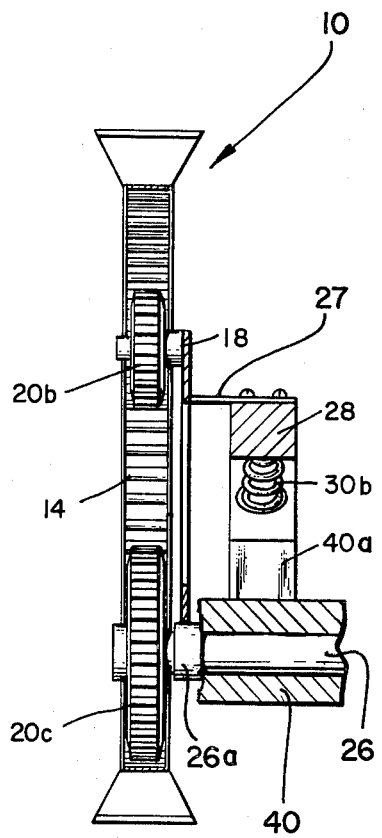
FIG. 4 is a vertical cross-sectional view taken on line 4—4 of FIG. 3.

Housing member 40 is equipped with a pair of upwardly extending spring support blocks 40a, 40b. The block 40b is about half way between the radial center of the wheel assembly and its forward extremity, while block 40a is similarly positioned at the rear. As best seen in FIG. 4, the horizontal member forming the upper portion of roller frame 18 is equipped with a flange or bracket 27 which extends inwardly of the vehicle, and underneath which a V-shaped spring support block 28 is attached. The spring support block 28 is, therefore, in the same vertical plane as the housing extension blocks 40a, 40b. A pair of compression springs 30a, 30b are disposed in the spaces that lie between the block 28 and the block 40a, 40b, respectively.

Figure 3:
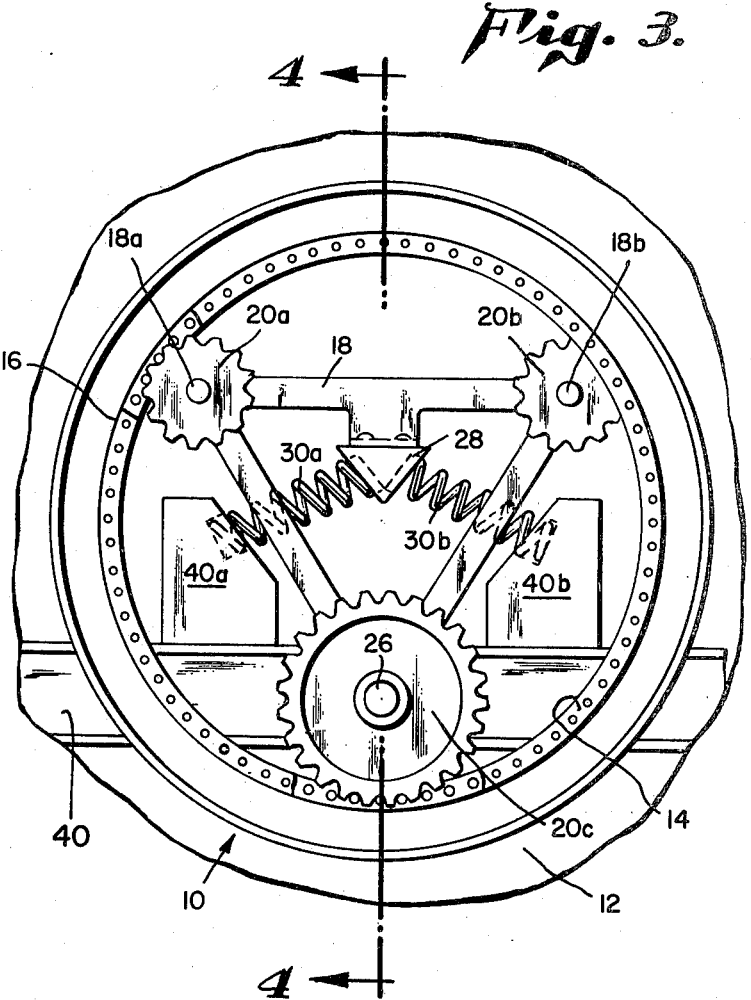
FIG. 3 is an elevation view of a second embodiment of the invention, which is applied to a driven wheel of a wheeled vehicle.

As in the previous embodiment the springs do not lie in a straight line, but are at an angle relative to each other. Specifically, in the normal position of the apparatus as shown in FIG. 3 each of the springs is angled downwardly at about 25 degrees from the horizontal with its upper end being received in an appropriate recess in the spring block 28 of roller frame 18 while its lower end is received in a corresponding recess in the respective housing extension block 40a or 40b.

OPERATION

The operation of the second embodiment is generally the same as for the first embodiment. However, rather than the rotatable member 12, 16, 14 being supported upon the main sprocket wheel 20c, there is an opposite relation, with the sprocket and its drive shaft 26 being supported by the wheel assembly. While the location of the springs is somewhat closer to the radial center of the rotatable member than was the case in the first embodiment, and while the frame structures which support them are somewhat differently arranged, the functional operation of the springs is nevertheless substantially identical to that in the first embodiment.

Figure 6:
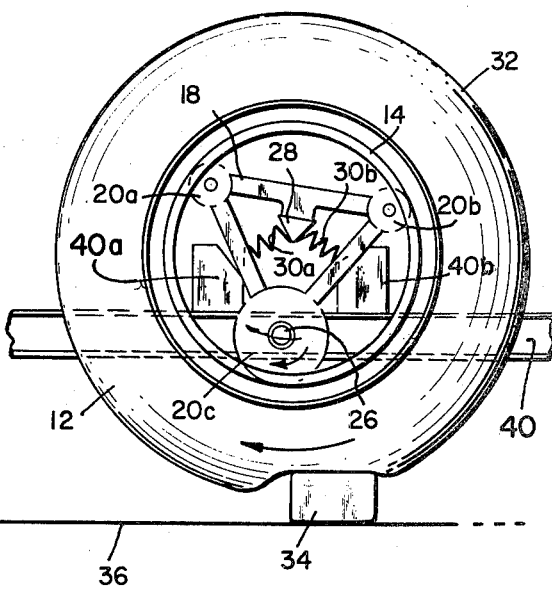
FIG. 6 is a view like FIG. 5, but after the obstacle has been successfully negotiated.

FIGS. 5 and 6 illustrate the situation that occurs when the wheel assembly encounters an obstacle upon the roadway surface 36, such as the obstacle 34. The response of the resilient transmission of the present invention will be somewhat different depending upon whether the vehicle is traveling very rapidly or very slowly.

If the vehicle is traveling very slowly, then the kinetic energy of rotation of the wheel assembly is very small. When the tire 12 strikes the obstacle 34 the rotation of the wheel assembly is significantly slowed down. However, the vehicle including the housing 40 that forms a part of its frame assembly will continue to move forward. The driven rotation of shaft 26 causes the main sprocket wheel 20c to move forward inside the track 14 and at the same time to climb upwards on the track. This movement in turn raises the housing 40 and the associated portion of the vehicle frame assembly. As this action takes place the rearmost spring 30a becomes more compressed while the forward spring 30b is extended or stretched out.

Continued forward movement of the vehicle causes the sprocket wheels 20c, 20b, acting in concert, to drive the wheel assembly forward and hence cause it to be raised upon the obstacle 34. At the same time the housing 40 is elevated, and the apparatus assumes the position shown in FIG. 6. As shown in FIG. 6 the forward spring 30b has become compressed while the rearward spring 30a has become extended or stretched out. This condition represents an oscillation of the mechanically oscillatory assembly that includes the roller frame, sprocket wheels, and springs. That is, the assembly has not only returned to its original condition of rest as shown in FIG. 3 but has also moved beyond that position. As described in conjunction with the first embodiment the extent of such oscillation will depend upon the damping factor which results from the set of design values that are chosen for the particular apparatus, and also on the precise nature of the obstacle that is encountered.

It is readily apparent that when the vehicle is traveling at high speed the kinetic energy of motion of the wheel assembly is very large, and hence the drop in rotation rate of the wheel assembly, when expressed as a percentage, is much smaller. However, the general nature of the response is the same as when the vehicle is traveling at low speed, that is, the resilient transmission of the present invention acts to smooth both the horizontal and vertical components of the shock which results from encountering the obstacle on the roadway.

ALTERNATE FORMS

It will be readily apparent that the smooth rollers and smooth track of the first embodiment may be incorporated into the second embodiment, or that the sprocket wheels and toothed track of the second embodiment may be incorporated into the first embodiment.

While both of the illustrated embodiments of the invention employ rollers which are located inside a cylindrical track, it is also within the contemplation and scope of the invention to utilize a set of rollers which engage the cylindrical track on its exterior surface. Other parts of the structure are then rearranged accordingly.

Two particular arrangements of the springs have been illustrated, however, it is not necessary to utilize the exact type of springs as presently shown, but other types of mechanical springs may be substituted, including hydraulic cylinders utilizing a compressible hydraulic medium, if that should be desired.

In one form of the invention a single leaf spring is utilized. One of its ends is firmly supported on the housing means, and its other end extends radially inwardly into a gap formed in the roller frame. The free or inward end of the spring may then bend in either direction as needed, depending upon the direction of relative rotation of the roller frame, but will also provide a restoring force for regaining the normal position of the frame.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A torsionally resilient coupling for transmitting rotary motion, comprising, in combination:
    a cylindrical track;
    a rotatable member fixedly secured to said track to rotate therewith;
    a roller frame cooperatively associated with said track and having three separate roller means rotatably supported thereon, said three roller means rollingly engaging said track and being circumferentially spaced thereon so that said roller frame is rotatable relative to said track about the axis thereof;
    a shaft coaxially attached to one of said roller means to rotate therewith;
    housing means cooperatively associated with said shaft, said shaft being rotatable relative to said housing means in order to drivingly rotate said one roller means, said track, and said rotatable member; and
    bi-directional spring means coupled between said frame and said housing means and being resiliently deflectable so as to permit said frame to intermittently oscillate relative to said housing means by a significant part of a revolution;

whereby in response to a varying load thereupon the rotation of said rotatable member may be retarded or advanced relative to the rotation of said shaft in accordance with the intermittent oscillation of said frame.

2. A torsionally resilient coupling for transmitting rotary motion, comprising, in combination:

a rotatable member which is to be rotatably driven, said rotatable member having a cylindrical track fixedly secured thereto;

housing means;

an input shaft rotatably supported from said housing means, said housing means being comparatively stationary, and said input shaft being rotatably driven in order to drive said rotatable member;

a main roller fixedly secured upon said input shaft, said main roller rollingly engaging said track in order to drivingly rotate said rotatable member;

a roller frame cooperatively associated with said track and rotatably secured to said main roller, said roller frame also having a pair of idler rollers associated therewith and rotatably supported thereon, said idler rollers also rollingly engaging said track and being circumferentially spaced thereon from each other and from said main roller; and bi-directional spring means coupled between said roller frame and said housing means and being resiliently deflectable so as to permit said roller frame to intermittently oscillate by a significant part of a revolution relative to said housing means;

whereby in response to to a varying load upon said rotatable member, its rotation may be retarded or advanced relative to the rotation of said input shaft.

3. A torsionally resilient coupling for transmitting rotary motion from the main frame of a wheeled vehicle to a powered wheel of the vehicle, comprising, in combination:

cylindrical track means disposed concentric to the wheel and fixedly secured thereto;

housing means forming a part of the main frame of the vehicle;

an input shaft rotatably supported from said housing means;

a main roller fixedly secured to said input shaft and rollingly engaging said track means in order to drivingly rotate the wheel in response to the driven rotation of said input shaft, said main roller normally resting within the lower portion of the interior surface of said track means;

a roller frame disposed in a vertical plane parallel to the plane of the wheel, said roller frame being rotatably secured to said main roller and also having a pair of idler rollers rotatably supported thereon which rollingly engage said track means at locations circumferentially spaced from said main roller; and resiliently deflectable, bi-directional spring means coupled between said roller frame and said housing means to permit said roller frame to intermittently rotate by a significant part of a revolution relative to said housing means.

4. Apparatus as in claim 3 wherein said roller frame is disposed on the interior side of the wheel, adjacent the vehicle.

5. Apparatus as in claim 4 wherein a spring block is attached to the interior side of said roller frame and forward and rearward spring block extensions are provided on said housing means; said spring means including a pair of coil springs, one disposed between said spring block and said rearward extension block and the other disposed between said spring block and said forward extension block.

6. Apparatus as in claim 4 wherein said housing means has an upwardly extending spring support arm, and said roller frame is equipped with forward and rearward spring control brackets; said spring means including a pair of coil springs, one disposed between said support arm and said rearward bracket and the other disposed between said support arm and said forward bracket.

7. Apparatus as in claim 3 wherein each of said rollers is provided with teeth, and said track means has tooth means thereon to matingly engage said rollers.

8. Apparatus as in claim 3 wherein said spring means includes a pair of coil springs disposed in longitudinally extending relation but at an angle of about 50 degrees relative to each other, the junction of said springs being secured to said roller frame and the ends thereof being secured to said housing means, each of said springs being disposed substantially parallel to an adjacent portion of said track means.

* * * * *